United States Patent
Esumi (10) Patent No.: US 6,707,626 B2
(45) Date of Patent: Mar. 16, 2004

(54) APPARATUS AND METHOD FOR DETECTING SYNC SIGNALS WRITTEN ON A DISK MEMORY DEVICE

(75) Inventor: Atsushi Esumi, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 437 days.

(21) Appl. No.: 09/748,149

(22) Filed: Dec. 27, 2000

(65) Prior Publication Data

US 2001/0014054 A1 Aug. 16, 2001

(30) Foreign Application Priority Data

Dec. 27, 1999 (JP) .......................... P11-370869

(51) Int. Cl.$^7$ ................................ G11B 5/09
(52) U.S. Cl. ............................ 360/51; 360/53
(58) Field of Search .................... 360/51, 53, 31, 360/48; 714/814, 770, 701, 769; 365/233

(56) References Cited

U.S. PATENT DOCUMENTS 5,461,633 A    10/1995    Kitamura
5,977,881 A  * 11/1999    Kido ........................ 340/7.27
6,124,994 A  *  9/2000    Malone, Sr. ................ 360/48
6,249,896 B1 *  6/2001    Ho et al. ................... 714/814
6,278,568 B1 *  8/2001    Cloke et al. ............... 360/51
6,366,327 B1 *  4/2002    Renner et al. .............. 348/558

FOREIGN PATENT DOCUMENTS

JP    10-125002    5/1998
JP    11-96681     4/1999

* cited by examiner

*Primary Examiner*—Andrew L. Sniezek
*Assistant Examiner*—Rocio Colon
(74) *Attorney, Agent, or Firm*—Pillsbury Winthrop LLP (57) ABSTRACT

An apparatus and method for detecting synchronous (SYNC) signals written on a disk memory device is performed by dividing a reproduced SYNC pattern, which includes a predetermined number of symbols, into a plurality of groups. Each of the plurality of groups includes at least one symbol that overlaps a symbol contained in another group. The invention outputs a SYNC detected signal when the symbols of at least one of the divided groups match the symbol of the SYNC pattern. In order to detect the SYNC signal, the invention increases the number of symbols included in each of the divided groups even when a large defect exists in the disk memory device.

4 Claims, 8 Drawing Sheets

SYNC PATTERN

| S1 | S2 | S3 | S4 | S5 | S6 |

ERROR SYMBOLS

GROUPING DIVISION INTO $_6C_2=15$ WAYS, EACH GROUP INCLUDES 4 SYMBOLS

SYNC PATTERN

Fig. 4A
| S1 | S2 | S3 | S4 | S5 | S6 |

↓ GROUPING DIVISION IN WHICH A GROUP INCLUDES DIFFERENT SYMBOLS FROM OTHER GROUPS

SYNC PATTERN

Fig. 5A
| S1 | S2 | S3 | S4 | S5 | S6 |

↓ SELECT GROUPS AMONG $_6C_2=15$ WAYS GROUPING DIVISION OF 4 SYMBOLS IN CONSIDERATION OF 2 CONTINUOUS SYMBOLS IN ERROR

APPARATUS AND METHOD FOR DETECTING SYNC SIGNALS WRITTEN ON A DISK MEMORY DEVICE

BACKGROUND OF THE INVENTION

1. Field of the Invention

The invention relates to disk memory devices, and more particularly, to an apparatus and method for detecting synchronous (SYNC) signals written on a disk memory device.

2. Description of the Related Art

Typically, a magnetic disk device is used to store and reproduce the data downloaded to a data processing device, such as a personal computer. In general, the data is recorded in every sector of each recording track contained on the magnetic disk medium of the magnetic disk device. Each sector includes a predetermined number of symbols. Typically in order to reproduce the data from the magnetic disk device, it is necessary to include a mechanism to accurately detect a head symbol provided in front of the recorded data. To achieve this objective, a SYNC signal pattern (hereinafter, referred to as a SYNC pattern) is typically written in front of a data area contained in each sector.

Figure 9:
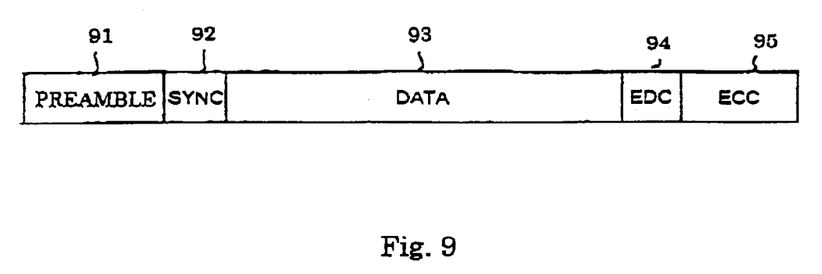
FIG. 9 illustrates a sector data format applicable to a magnetic disk device.

As illustrated in FIG. 9, a recording format for a data sector in the magnetic disk medium usually includes a preamble area 91, a SYNC pattern area 92, an actual data area 93, an error detecting code (EDC) area 94, and an error correcting code (ECC) 95.

The EDC 94 decodes and synchronously converts the serial data into parallel data. The ECC 95 corrects errors that develop in the reproduced data. In order to reduce the probability of detecting errors in the data, the EDC decoding is performed after the ECC corrects the data.

The preamble area 91 performs a phase lock on the reproduced data. In order to reliably maintain the synchronization of the reproducing data, the SYNC pattern area 92 detects a head position contained in the data area 93.

Thus, if the device begins to reproduce the data without correctly detecting the SYNC pattern, a timing error for reproducing the data may develop in several of the symbols. Such a shift of the reproducing time is referred to a flaming error. If such flaming errors occur in all of the sectors of the recording medium, such an occurrence is referred to as a burst error. When a burst error occurs, it may be impossible to correct an error detected in the data even if the ECC 95 coding is used on the reproduced data. In essence, it is extremely important to accurately detect the SYNC pattern since the SYNC pattern decides the performances of the magnetic disk device.

Generally, the SYNC pattern detection process is performed by comparing a predetermined reference SYNC pattern, which is recorded when the data is recorded onto the magnetic disk device, with a reproduced SYNC pattern generated when the data is reproduced from the magnetic disk device and by counting a number of symbols that match between the reference SYNC pattern and the reproduced SYNC pattern. Thus, when the number of matching symbols exceeds a predetermined number, then, the synchronization of the reproduced data is successful. Consequently, the device outputs a SYNC detected signal used to convert the serial data into the parallel data.

However, if the SYNC pattern area 92 in a recording sector contains a defect due to a flaw on the magnetic disk medium, it may be impossible to detect the SYNC pattern from the reproduced data. In an attempt to detect the SYNC pattern area 92, conventional techniques divide the SYNC pattern into groups and perform a comparison between the reference SYNC pattern and a reproduced SYNC pattern in the divided groups. The reproduced SYNC pattern is divided into a plurality of groups so as to assign a symbol only once to each of the divided group. A SYNC detected signal is generated when a predetermined number of symbols in the divided groups matches the symbols in the reference SYNC pattern. Thus, the conventional method for detecting the SYNC pattern area 92 aims to detect a match between a predetermined number of symbols in each of the divided groups with a predetermined number of symbols in the reference SYNC pattern.

Figure 10A:
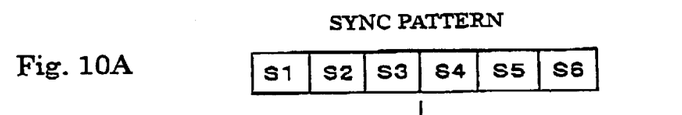
Figure 10B:
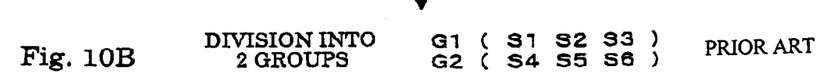
FIGS. 10B and 10C are examples for dividing the SYNC pattern according to a conventional method.
Figure 10C:
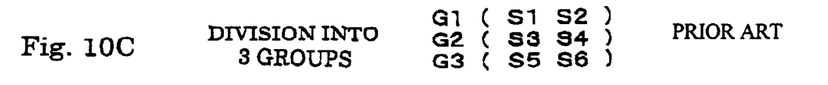

However, the conventional method contains a serious defect that will be explained with reference to FIG. 10. FIG. 10A illustrates an example of dividing a SYNC pattern that includes six symbols (S1, S2, . . . , S6), into two groups as shown in FIG. 10B. Thus, the six symbols of the SYNC pattern is divided into two groups so as to include three symbols in each groups, i.e., the group G1 includes of the first half of the symbols (S1, S2, S3) and the group G2 includes of the remaining second half of the symbols (S4, S5, S6). Similarly, FIG. 10C shows another example for dividing of the SYNC pattern according to the conventional method. In this case, the SYNC pattern is divided into three groups so as to include two symbols in each groups, i.e., the group G1 includes two symbols (S1, S2), the group G2 includes two symbols (S3, S4) and the group G3 includes two symbols (S5, S6).

As illustrated in FIG. 10B, if, for example, two symbols (S3, S4) among the six symbols (S1, S2, . . . , S6) of the SYNC pattern contain a defect due to a flaw in the recording area, it may be impossible to detect the SYNC since both of the divided groups G1, G2 include one of the defected symbols (S3, S4).

In comparison, in the case where the SYNC pattern division is divided into three groups G1, G2, G3, as shown in FIG. 10C, there are two groups G1 and G3 that do not include the defected two symbols S3, S4. Accordingly, by using either of the two groups G1 or G3, the comparison procedure may be able to successfully match the symbols between the reference pattern and the divided group of either group G1 or G3. Consequently, it may be possible to detect the SYNC signal.

However, since the example of FIG. 10B increases the number of the divided groups of the SYNC pattern in comparison to FIG. 10A, the number of symbols included in each of the divided groups naturally decreases. In FIG. 10B, each of the divided groups includes three symbols. However, in the case of FIG. 10C, each of the divided groups includes only two symbols. This creates another problem.

When the comparison between the reference SYNC pattern and the divided group is performed on such a small number of symbols as shown in FIG. 10C, the chances of detecting an error in the SYNC pattern increases. For example, as illustrated in FIG. 9, the detection of the SYNC pattern usually begins at the preamble pattern area 91 that is written in front of the SYNC pattern 92. If the preamble pattern 91 receives some influences of noises, since the SYNC pattern has been divided into such a small number of symbols, this increases the probability that the preamble pattern 91 is read as a part of the SYNC pattern 92 during the comparison procedure, which causes a SYNC detection error to occur.

Thus, although it is possible to eliminate the defected symbols from a group by increasing the number of the divided groups of the SYNC pattern. Conversely, such a case also increases the probability of generating an error detection of the SYNC pattern due to the comparison of such a small number of symbols included in each of the divided groups.

Accordingly, the conventional apparatus and method for detecting the SYNC contains serious shortcomings even if the SYNC pattern is divided into a plurality of groups in order to compensate for a defect due to flaws in a disk medium.

SUMMARY OF THE INVENTION

Therefore, there is a need for a device and method to perform a reliable SYNC detection on a disk storage medium even when the storage medium contains a defective recording area.

An apparatus and method for detecting SYNC signals according to the invention solve the aforementioned problems and defects of a conventional apparatus and method. Namely, the object of the present invention is to provide a novel apparatus and method for reliably detecting SYNC signals even when the SYNC pattern area includes defects created by flaws contained in the recording medium.

In order to achieve the above-mentioned objectives, the invention provides an apparatus for detecting SYNC signal written on a disk memory device. The disk memory device is a recording medium, which can reproduce data including a SYNC pattern recorded therein. The SYNC pattern includes a predetermined number of symbols written in a predetermined recording unit of the record medium. The invention may also include a data reproducing mechanism for reproducing the data including the SYNC pattern. A data dividing means may also be provided in the invention for dividing the reproduced SYNC pattern into a plurality of groups. Each of the plurality of groups may include at least one symbols contained in another divided group so as to overlap the symbols within the divided groups. The invention may also include a comparison mechanism for comparing the symbols of the SYNC pattern with the symbols of each of the divided groups in order to detect a match between the SYNC pattern and at least one group of the divided groups. The invention may further include an output mechanism for outputting a SYNC detected signal when the symbols of at least one of the divided groups matches the symbols of the SYNC pattern.

Thus, the apparatus for detecting SYNC signal written on a disk memory according to the invention is characterized in that a SYNC pattern is divided into a plurality of groups so that at least one of the symbols of the SYNC pattern is included in at least two of the divided groups so as to overlap in with another divided groups. By arranging the symbols in the divided groups in this manner enables the invention to increase the number of symbols included in each of the divided groups. Consequently, the invention can reduce the likelihood of an error detection of SYNC signal of occurring even when there is a relatively larger defect included in the SYNC pattern.

Further, the apparatus and method for detecting the SYNC signal according to the invention may perform the SYNC detection process much more efficiently by changing from an initial detection step, which uses the SYNC pattern as a whole in a normal operation (hereinafter, referred to as a whole SYNC pattern detection), to a second detection step, which detects the SYNC signal by dividing the SYNC pattern into a plurality of groups as mentioned above (hereinafter referred to as a divided SYNC pattern detection). The second detection step operates a retry operation when the first detection step fails to detect the whole SYNC pattern detection.

The apparatus according to invention a comparison mechanism that may contain a plurality of parameters that may be used to determine whether a match exists between the symbols of the SYNC pattern and the divided group. Thus, the comparison mechanism determines the conditions for detecting the SYNC pattern when a predetermined number of symbols of the SYNC pattern matches a predetermined number of symbols of the divided group. This feature also serves to increase the probability for outputting the SYNC detected signal.

Still further, the apparatus and method for detecting SYNC according to the invention can enhance the condition for detecting the SYNC by increasing the number of the symbols assigned the SYNC pattern and the divided groups in order to reduce the probability of a generating an error detection signal.

In a practical application, when the SYNC pattern includes (n) symbols, the apparatus and method for detecting SYNC according to the invention may perform the SYNC detection process by comparing each of the symbols of the SYNC pattern to each of a (n–k) symbols of the divided groups to satisfy the formula $_nC_k$ groups. Each of the divided group comprises (n–k) symbols in order to detect the SYNC detected signal even when (k) symbols of the reproduced SYNC pattern include errors (here, (k) is a natural number that satisfies the condition, k<n, (n) represents the number of symbols contained in the SYNC pattern and (k) represents the number of symbols containing an error).

The invention may simplify the circuit construction for comparing each of the symbols by including an additional group of symbols, which contains a different number of symbols that the divided groups of $_nC_k$. Further, instead of using the (n–k) symbols for the $_nC_k$ groups, it is also possible to use consecutive k symbols in order to compensate for defects contained in consecutive symbols.

Still further, the invention may change the conditions for controlling the retry operation of the divided SYNC pattern detection in order to increase the probability for detecting the SYNC. Thus, the number of symbols included in each of the divided groups may be gradually reduced as the number of retry attempts increases.

Still furthermore, the apparatus and method for detecting SYNC according to the invention may register a defective sector in the recording medium when the comparison mechanism detects a match between a smaller number of symbols in the divided group than a predetermined number of symbols. Thus, during the retry operation, if the comparison mechanism detects coincidence a match of the symbols between a smaller number of symbols of the divided group than the reduced predetermined number of symbols, the corresponded recording sector is registered as a defective area.

Additional objects and advantages of the invention will be set forth in the description that follows, and in part will be obvious from the description, or may be learned by practicing the invention. The objects and advantages of the invention may be realized and obtained by means of the instrumentalities and combinations particularly pointed out in the appended claims.

BRIEF DESCRIPTION OF THE DRAWINGS

A more complete appreciation of the present invention and many of the attendant advantages thereof will be obtained as the same becomes better understood by reference to the following detailed description when considered in connection with the accompanying drawings.

DESCRIPTION OF THE PREFERRED EMBODIMENTS

Reference will now be made in detail to the preferred embodiments of the present invention, examples of which are illustrated in accompanying drawings. Wherever possible, the same reference numbers will be used throughout the drawings to refer to the same or like parts.

Figure 1:
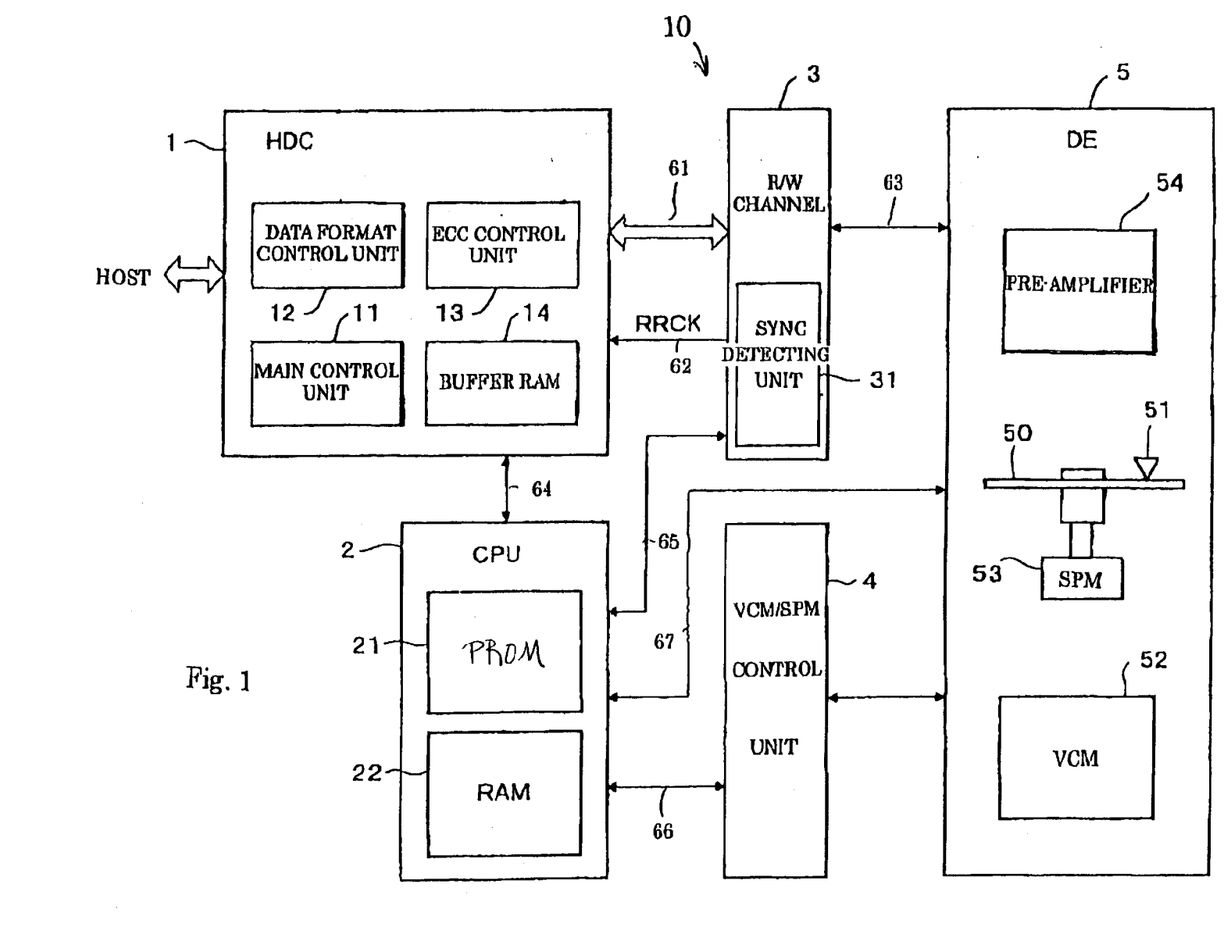
FIG. 1 is a block diagram illustrating components of a magnetic disk device applicable to an apparatus and method for detecting SYNC signals according to the invention.

As illustrated in FIG. 1, a magnetic disk device 10, which is an applicable apparatus and method for detecting SYNC signals consistent with the invention, includes a hard disk controller (HDC) 1, a central processing unit (CPU) 2, a read/write (R/W) channel 3, a voice coil motor/spindle motor (VCM/SPM) controller 4 and a disk enclosure (DE) 5. Typically, the HDC 1, the CPU 2, the R/W channel 3 and the VCM/SPM controller 4 are provided in a single board.

The HDC 1 includes a main control unit 11, a data format control unit 12, an ECC control unit 13 and a buffer RAM. The HDC 1 couples to a host system (HOST) through an interface unit for transferring data between the magnetic disk device 10. The HDC 1 is further couples to the R/W channel 3 via a data bus 61. The R/W channel 3 generates read reference clock signals (RRCK) 62 supplied to the HDC 1.

The data format control unit 12 in the HDC 1 converts data transferred from the HOST into a suitable format for recording the data in a track contained on a magnetic disk medium (MD) 50 in the disk enclosure (DE) 5. The data format control unit 12 also converts the reproduced data from the MD 50 into a suitable format for transferring the reproduced data to the HOST.

The ECC control unit 13 in the HDC 1 adds redundancy data (redundancy symbols) to the recording data (information symbols) for detecting and correcting errors included in the data reproduced from the disk medium 50. The number of data bytes that may be corrected errors depends on the length of the redundancy data. Namely, as the length of the redundancy data increases so does the device's ability to correct the errors contained in the data bytes. However, the efficiency of the MD's format deteriorates by adding a larger number of redundancy data.

The buffer RAM 14 in the HDC 1 stores the transferred data from the HOST for transmitting the data to the R/W channel 3 at an appropriate timing. The R/W channel 3 further stores the reproduced data from the MD 50 for transmitting the reproduced data to the HOST at an appropriate timing after the completion of the ECC decoding operation.

The CPU 2 couples to the HDC 1, the R/W channel 3, the VCM/SPM controller 4 and the DE 5 through each of the respective buses 64 to 66. The CPU 2 includes a PROM 21 for storing programs for operations and a RAM 22.

The R/W channel 3 includes a write channel for transmitting the recorded signals to the DE 5, and a read channel for receiving the reproduced signals from the MD 50 in the DE 5. Further, the R/W channel 3 includes a SYNC detecting unit 31 for executing a comparison between a reference SYNC pattern and a SYNC pattern in the reproduced data in order to detect a SYNC signal by counting the number of matching symbols.

The write channel in the R/W channel 3 includes a scrambler for converting the data transferred from the HDC 1 into a suitable order for recording, a run length limited (RLL) encoder, a data generator for generating a preamble data added at a head portion of the recorded data and a SYNC signal data, a writing pre-compensation for a non-linear transition shift (NLTS) and a write driver for supplying recording signals, which are generated after the pre-compensation, to the DE 5.

The read channel in the R/W channel 3 includes an automatic gain controller (AGC, a sample/hold (S/H), a digital/analog (A/D) converter, an equalizer, a viterbi detector, a RLL decoder, a descrambler and a SYNC detector.

The reproduced signals transferred from the DE 5 are adjusted according to their gain by the AGC. The S/H and the A/D converter convert the gain-adjusted signals into digital data. The equalizer equalizes the digital data in order to fit to a class of a partial response. Then, the viterbi detector decodes the equalized digital data. Finally, the signals generated by the RLL decoder and the descrambler are transferred to the HDC 1.

As explained in the above, the SYNC detecting unit 31 in the R/W channel 3 compares a reference SYNC pattern and a reproduced data pattern in order to detect the SYNC signals by counting the number of matching symbols between the two patterns. Thus, when the counted number of the matching symbols reaches a predetermined number, the SYNC detecting unit 31 provides a SYNC detected signal, which is used for converting the serial data into parallel data.

The DE 5 includes a disk medium 50 for storing data, at least one magnetic head 51 for writing/reading data on the disk medium 50, a voice coil motor (VCM) 52 for driving a rotary actuator to load and unload the magnetic head 51, a spindle motor (SPM) 53 for driving the disk medium 50 and the pre-amplifier 54. The DE 5 couples to the VCM/SPM controller 4, which controls the VCM 52 and the SPM 53.

For the purpose of simplifying the disclosure, FIG. 1 illustrates a single disk medium 50 and a single magnetic head 51 that is provided on one side of the disk medium 50. But, of course, it is consistent with the invention to include a disk device containing a plurality of disk media, which is stacked along the spindle motor (SPM) 53. In such a case, each magnetic head is provided so as to face the respective surfaces of the plurality of disk medium.

The pre-amplifier 54 amplifies the recording signals transmitted from the RJW channel 3 to the DE 5. Then, the magnetic head 51 records the signals onto a track in the disk medium 50. When the disk medium is played by reproducing the recorded signals, the reproduced signals on the track in the disk medium 50 are transmitted to the R/W channel 3 through the preamplifier 54.

Rotation of the actuator along a radius direction of the disk medium 50 executes the loading/unloading of the magnetic head 51. That is, in order to locate the head position over the recording tracks of the disk medium 50, the head 51 moves in a circular direction inwardly toward the disk medium 50.

Furthermore, the disk medium 50 may contain some small defects, such as a flaw or a scratch in the recoding sector, which were undetectable during the quality review step of the manufacturing process of the disk medium 50. Such defects in the disk medium 50 causes errors to be generated in the data written on the recording sector of the disk medium 50. If the defects exist in the data area 93 of the written data format (FIG. 9) of the disk medium 50, it is possible to use the ECC95 to correct the errors due to the defects. However, if the defects exist in the SYNC pattern area 92 (FIG. 9), it may not be possible to correct the errors since the ECC cannot be applied to the SYNC pattern. Consequently, it may be impossible to detect the SYNC signal if the defects occur in the SYNC pattern area even when a retry operation for detecting the SYNC signal is repeated.

The apparatus and method according to the present invention may reliably detect the SYNC signal even when such defects exist in the SYNC pattern area. For achieving such reliable detection of the SYNC signal, when the SYNC pattern is divided into a plurality of groups according to the invention, each of the divided groups includes some of the symbols that are also included in another group. Thus, at least one symbol of the SYNC pattern repeatedly appears in a plurality of the groups generated by the division of the SYNC pattern. Hereinafter, such a repeated appearance of at least one symbol in at least two groups of the divided SYNC pattern is simply referred to as a overlapping of a symbol. Thus, a plurality of groups that includes at least one element of the same symbol is referred to as overlapping groups. The apparatus and method according to the present invention detect the SYNC signal when a predetermined number of groups can match the corresponding symbols of the divided group to the reference symbols.

Now, suppose that the SYNC pattern includes n symbols and k symbols, and, among the n symbols, i.e., k<n, a defect exists in a sector of the disk medium. In order to reliably detect the SYNC signal, the SYNC pattern is divided in to a plurality of groups, each of which is comprised of (n−k) symbols. To determine the total number of divided group, the invention uses the equation $_nC_k$. Thus, at least one group among the $_nC_k$ method of the dividing the groups does not contain a detected symbol so that this at least one group does not received any influence from the defects.

Accordingly, it is possible to use the non-influenced groups to detect the SYNC signal. When implementing the comparison step to detect the SYNC signal, the invention does not need to match all of the symbols in the comparison group with all of the reference symbols. It is possible to detect the SYNC signal when a predetermined number of symbols in the comparison group coincide with a predetermined number of the reference symbols.

Figures 2A, 2B:
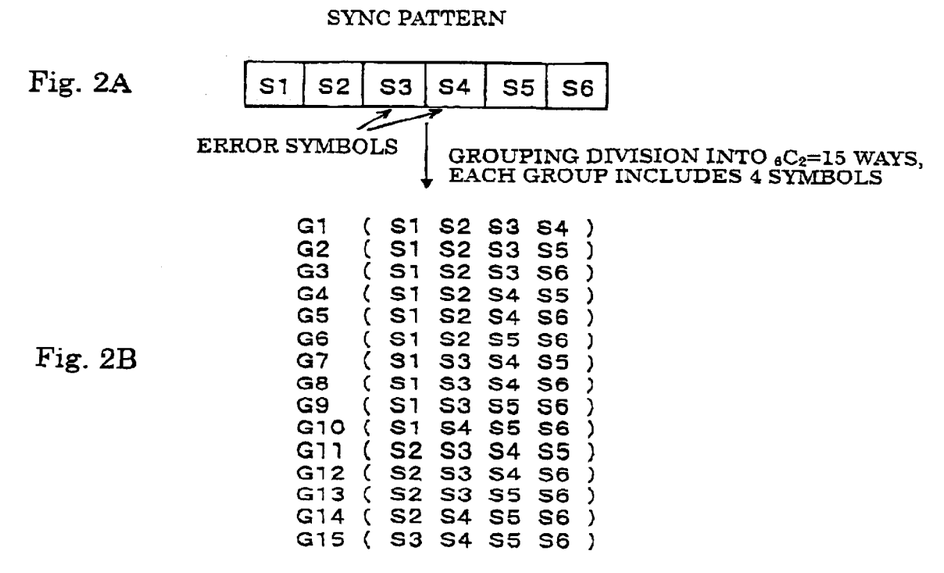
FIGS. 2A, 4A, 5A and 10A are examples of a SYNC pattern that includes six symbols.
FIG. 2B illustrates an embodiment of the groups divided according to the invention so as to include at least one of the symbols for the SYNC pattern in at least two of the divided groups so that the symbols overlap in another divided groups.

FIGS. 2A and 2B illustrate, by way of example, the above-mentioned division of groups approach according to an embodiment of the invention. In this exemplary embodiment, the values are n=6, k=2, where n equals the number of recorded symbols and k equals the total of defected symbols. In FIGS. 2A and 2B, for explanation purposes, the total number of recorded symbols (n) has been set to a value that is smaller than the number of recorded symbols that would be contained in most practical disk medium.

As shown in FIG. 2A, the SYNC pattern includes six symbols of S1, S2, S3, S4, S5 and S6. In this example, the objective is to reliably detect a SYNC signal even when a defect exists in possibly two symbols. In such a case, the SYNC pattern is divided into a plurality of groups, each of which includes (k−n) symbols, i.e., 4 symbols.

It is possible to generate the division of groups, each including (n−k) symbols, by using the equation $_nC_k$ to determine the total number of groups, i.e., $_6C_2=15$, each of which includes four symbols. Thus, the SYNC pattern is divided into the fifteen groups G1, G2, . . . , G15. As shown in FIG. 2B, each of the divided groups includes four symbols, such as G1 includes four symbols, S1, S2, S3 and S4, and the group G2 includes four symbols, S1, S2, S3 and S5, and so on. Thus, a plurality of the groups, e.g., G1 and G2, are divided so as to include the overlapping symbols, e.g., S1, S2 and S3. For example, the two symbols, S3 and S4, may contain errors due to a defect of the SYNC pattern area.

As illustrated in FIG. 2B, group G6 does not include the error symbols S3 and S4 distributed among the divided fifteen groups. Consequently, it is possible to correctly detect a SYNC signal when a comparison of the SYNC pattern is performed against the non-influenced group G6.

As explained before, it is desirable to include as many symbols as possible in a divided group of the SYNC pattern in order to avoid receiving an error detection message of a SYNC signal. Thus, as shown in FIG. 10B, according to the conventional method, it is possible to avoid the error symbols S3 and S4 only when the SYNC pattern is divided into three groups, each of which includes two only symbols. On the contrary, the overlapping division according to the present invention can include four symbols of the SYNC pattern in each group, twice as many as the conventional method. Consequently, it is possible to reduce the possibility of receiving an error detection message of the SYNC signal.

Figure 3:
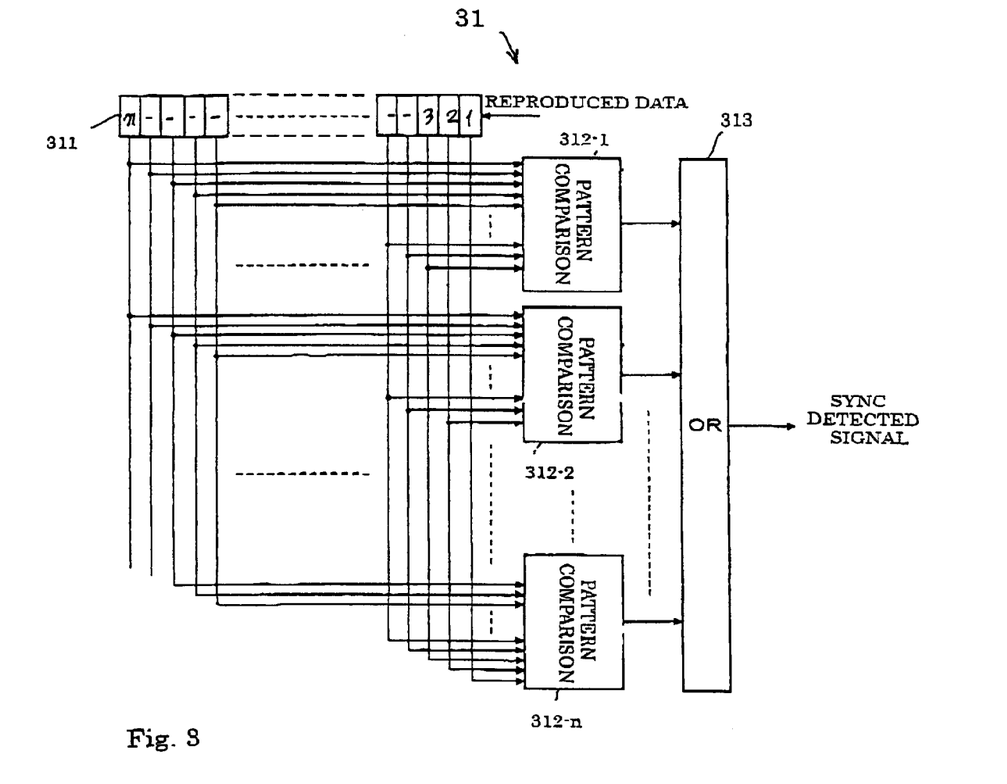
FIG. 3 is a block diagram illustrating the components of a SYNC detector shown in FIG. 1 for accomplishing the SYNC detection using the divided groups in FIG. 2B.

FIG. 3 illustrates an embodiment of the circuit's composition of the SYNC detecting unit 31 (FIG. 1), which accurately detects a SYNC signal even when a defect exist in two symbols of the SYNC pattern.

As illustrated in FIG. 3, the reproduced data from the disk medium 50 is supplied to a shift register 311, which includes the same number of delay elements as the number of n symbols of the SYNC pattern. Each of the n delay elements in the shift register 311 is respectively coupled to pattern comparing circuits 312-1, 312-2, ..., 312-n. Thus, the (n−2) delay elements in the shift register 311 connect to each of the pattern comparing circuits 312-1, 312-2, ..., 312-n so as to perform a comparison with all of the possible combination of the divided groups according to the $_nC_2$ approach.

Thus, in the case where the number n=6, the pattern comparing circuits 312-1, 312-2, ..., 312-15 respectively correspond to the groups G1–G15, as shown in FIG. 2B.

Each of the pattern comparing circuits 312-1, 312-2, ..., 312-n couples to an OR gate 313 for supplying a SYNC detection signal, for example, an output "1" when at least one of the $_nC_k$ pattern comparing circuits matches between the symbols of the reference SYNC pattern and the symbols of the divided groups.

In the circuit shown in FIG. 3, instead of using the OR gate 313, it is also possible to use a threshold judging circuit for outputting a SYNC detection signal when a predetermined number of the pattern comparing circuits matches a predetermined number of the reference of the SYNC pattern,.

Figure 4A:
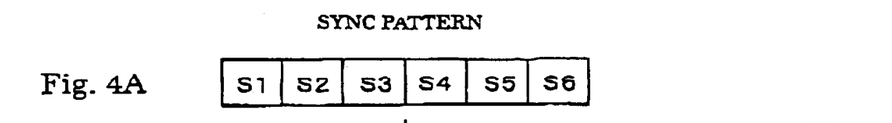
Figure 4B:
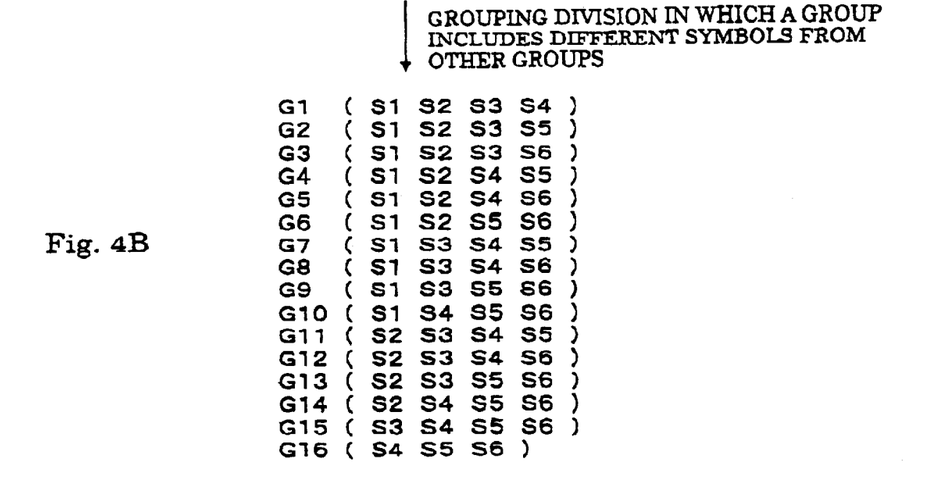
FIG. 4B illustrates another embodiment of the division of groups approach for detecting the SYNC signal as shown in FIG. 2A.

FIGS. 4A and 4B illustrates a modification of the SYNC pattern division approach in FIG. 2B in order to increase the possibility of detecting a SYNC signal. In FIG. 2B, each group includes the same number of symbols, i.e., 4 symbols. However, if there is a high possibility of the symbol error occurring in the first half of the SYNC pattern, i.e., the three symbols S1, S2 and S3 in FIG. 4A, it is possible to add another group which includes a different number of symbols than the groups G1–G15. Thus, in the example of FIG. 4B, a group G16 is added to the embodiment of FIG. 2B in order to enhance the possibility of detecting a SYNC signal. Thus, the added group G16 includes the last half of the SYNC pattern, i.e., the three symbols S4, S5 and S6 that have a greater chance detecting a SYNC signal.

Figure 5A:
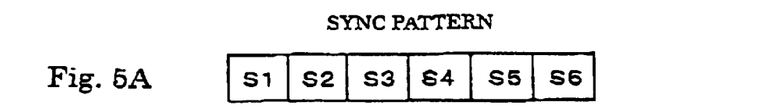
Figure 5B:
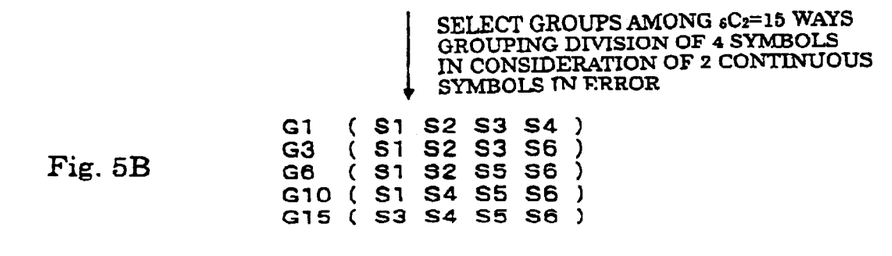
FIG. 5B illustrates a further embodiment of the division of groups approach for detecting the SYNC signal as shown in FIG. 2A.

FIGS. 5A and 5B demonstrates another embodiment of selecting the groups. Generally, defects will occur on a disk medium in consecutive symbols. For example, when two error symbols occur among the six symbols in the SYNC pattern, as shown in FIG. 5A, there is a higher possibility for errors to occur in the in two consecutive symbols. For example, there is an increased likelihood of occurrence in symbols such as S1 and S2 than among the discontinuous symbols, such as S1 and S3, or S2 and S5. Consequently, it is also possible to arrange the groups so that some of the divided groups contain discontinuous symbols. FIG. 5B illustrates such an arrangement of discontinuous symbols among the fifteen groups including four symbols as shown in FIG. 2B. Thus, group G1 is arranged in consideration of a possible occurrence of error in continuous two symbols S5 and S6. The group G3 is selected in consideration that the error may occur in the two consecutive symbols S4 and S5. Similarly, the group G6 is arranged in consideration that the error may occur in the two consecutive symbols S3 and S4. The groups G10 and G15 were also selected in order to avoid the two consecutive symbols S2 and S3, and S1 and S2, respectively.

Figure 6:
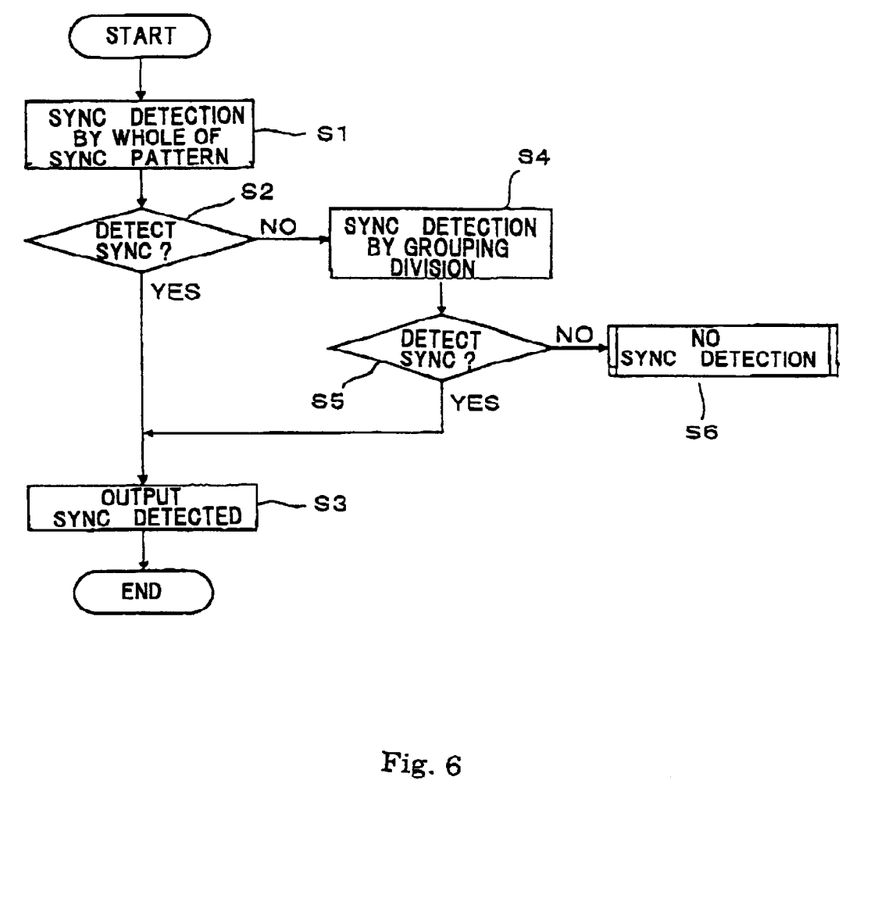
FIG. 6 is a flowchart of an embodiment of the present invention for performing the SYNC detection by utilizing both the whole SYNC pattern detection in a normal condition and changing to the divided group detection method utilizing a retry operation.

FIG. 6 illustrates another embodiment of the apparatus and method for detecting SYNC signal according to the invention. In this embodiment, the SYNC detection is performed by initially applying the whole SYNC pattern detection according to normal conditions. If the whole SYNC pattern detection does not perform a successful detection, then the invention changes the detection procedure and begins to apply the divided group detection approach to the symbols. Thus, this method combines the whole SYNC pattern detection and the divided groups detection approach according to the first embodiment of the invention.

This embodiment is also performed in the SYNC detecting unit 31 based on the control of the CPU 2 in FIG. 1.

According to the flow diagram of FIG. 6, during a normal operation, the SYNC is detected by comparing the SYNC pattern as a whole to the reproduced data without dividing the symbols (Step S1). When the SYNC is detected by the comparison of the whole pattern (Step S2, YES), the SYNC detected signal is outputted (Step S3). If the SYNC is not detected by the comparison of the whole pattern (Step S2, NO), the SYNC detection process using the group division approach, as explained above, is executed as a retry operation (Step S4). If the SYNC signal is detected by the comparison of the divided pattern (Step S5, YES) during the retry operation, the SYNC signal is outputted (Step S3). If the SYNC signal is not detected by the comparison of the divided pattern (Step S5, NO), the CPU2 executes a process for a non-detection of the SYNC signal (Step S6).

Figure 7:
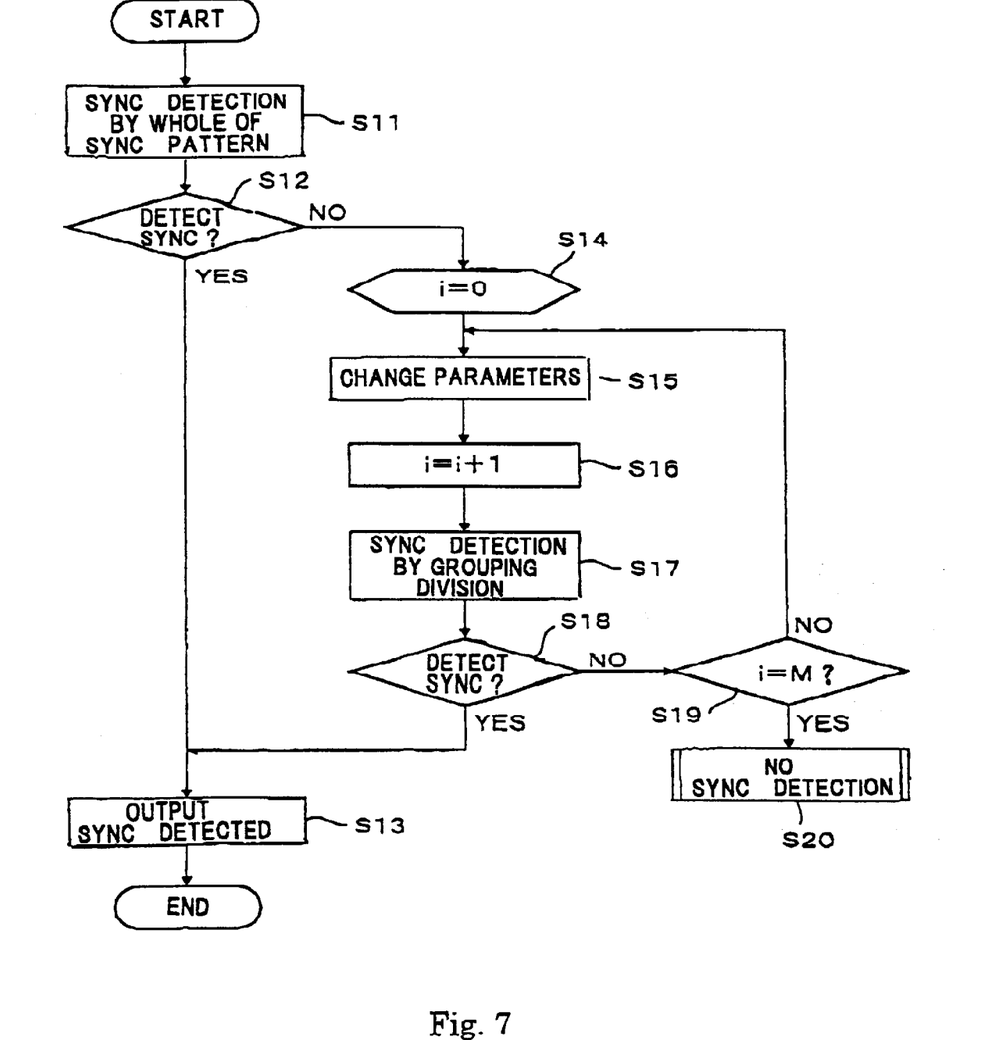
FIG. 7 is a flowchart for illustrating a modification of the SYNC detection shown in FIG. 6, in which the parameters for detecting the grouped SYNC pattern are changed in each retry operations.

FIG. 7 demonstrates a modification of the method shown in FIG. 6 in which the retry operation detects the SYNC signal by using the divided groups only once. In FIG. 7, this embodiment repeats the retry operation for detecting the SYNC signal by changing various parameters, i.e., conditions, for detecting the SYNC so as to increase the probability of the detection. However, it should be noted that the attempts to detect the SYNC signal using the retry operation is limited to a maximum value of M.

According to the flow diagram of FIG. 7, during normal operation, as previously explained with regards to FIG. 6, the invention detects the SYNC signal by making a comparison of the whole SYNC pattern (Step S11), and, if the SYNC signal is detected (Step 512, YES), a SYNC detected signal is outputted (Step S13).

If the SYNC signal is not detected by the detection due to the whole SYNC pattern (Step 512, NO), a value in a retry counter for counting the attempts of the retry operation is initialized, i.e., i=0 (Step S14). Then, various parameters, such as a grouping method, a threshold for the pattern comparison, a threshold for judging an output of the SYNC detected signal, and so on, are set (Step S15). These parameters are gradually changed so as to increase the probability of detecting the SYNC signal as the retry operation is repeated. As the retry operation is repeated, the value (i) in the retry counter increases incrementally by adding 1 (Step S16). Thus, at the first retry operation, after setting the value (i) in the counter to "1", the SYNC detection according to the grouping division approach is performed (Step S17). If the SYNC signal is detected in the retry (Step S18, YES), the SYNC detected signal is outputted (Step S13). If the SYNC signal is not detected in the retry operation (Step 518, NO), the CPU 2 (FIG. 1) determines whether or not the attempts of the retry operation has reached the predetermined maximum value M, i.e., i=M (Step S18).

If the frequency (i) for the retry operation has not reached the maximum value M (Step S18, NO), the parameter is changed so as to increase the probability of detecting the SYNC signal (Step S15). Then, after incrementing the value in the retry counter (StepS16), the SYNC detection method using the grouping division approach is repeated (Steps S17, S18).

If the SYNC signal is not detected even when the frequency of the retry reaches the predetermined maximum value M (StepS19, YES), the SYNC signal cannot be determined so the retry operation terminates (Step S20).

Thus, in this embodiment, the SYNC signal detecting operation is performed after the various parameters have been changed so as to increase the probability of detecting the SYNC signal as the number of the attempts of the retry operation increases. A simple method for increasing the probability of detecting the SYNC signal while increasing the number of attempts of the retry operation is to gradually reduce the number of symbols included in the divided group. Thus, at an initial stage of the retry operation, the SYNC signal detecting operation is performed by dividing the SYNC pattern into a small number of groups so as to include a large number of the symbols in each of the divided groups. As the number of attempts of the retry operation increases, the detection process also increases the number of the divided groups, i.e., by reducing the number of symbols included in each of the groups.

At the initial stages of the repetition for the retry operation, the number of symbols included in each group is maintained at a relatively small value in order to reduce the occurrence of an error detection of the SYNC signal. However, when the retry operation has been repeated without detecting the SYNC signal, the number of the symbols included in each of groups is reduced so as to increase the probability of detecting SYNC signal. In order to avoid generating an error detection of the SYN signal as the number of symbols of each group decrease, the invention adjusts the various parameters of the disk memory device 50.

In this exemplary embodiment, the retry operation for detecting SYNC according to the grouping division approach is performed by changing the various parameters so as to increase the probability of detecting a SYNC signal. However due to the grouping division approach, it is also possible to repeat the SYNC detection while maintaining the same parameter settings.

Figure 8:
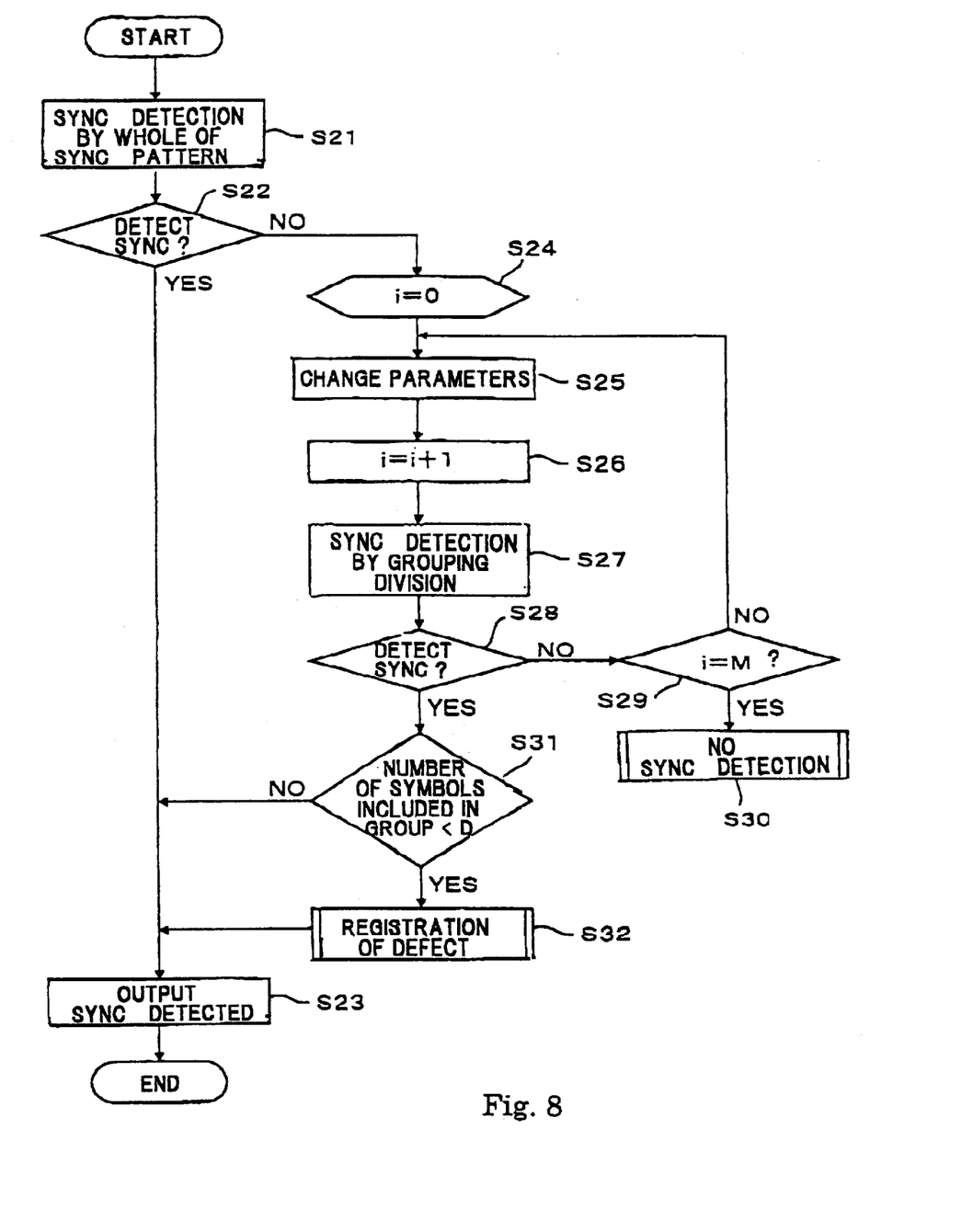
FIG. 8 is a flowchart illustrating a further modification of the SYNC detection demonstrated in FIG. 7, in which a registering function is added in order to record the parameters to detect the SYNC pattern.

FIG. 8 illustrates a further embodiment of detecting SYNC signals written on the disk memory device shown in FIGS. 6 and 7. The basic operations, i.e., steps S21–S30, in this modification are the same in the steps explained in the first modification shown in FIGS. 6 and 7. In this modification, a registering step is added for registering a sector that includes a defect in order to increase the performance for the disk storage device.

During the repetition of the retry operation, if the SYNC is detected by changing the parameters step-by-step (Steps S25–S28, YES), the number of symbols included in the group used to detect the SYNC pattern is compared to the predetermined number of symbols D for the divided group detection (Step S31). If the number of the symbols included in the divided group used to detect the SYNC pattern is smaller than the predetermined number of D, there is a high probability that there exists a relatively larger defect in the SYNC portion of the corresponding recording sector. Accordingly, the corresponded recording sector is registered as a defect (Step S32) in order to allot another sector for recording. Consequently, the defected recording sector can be avoided to prevent the performance of the disk memory device from deteriorating. After the registration of the defect, a SYNC detected signal is outputted (Step S23).

In this modification, the number of symbols included in the group is used for judging the registration of the defect. However, it is also possible to use other parameters, such as a threshold for the comparison of the pattern or a threshold for outputting the SYNC detected signal to register a defect.

As explained above, the apparatus and method according to the invention performs a SYNC detection by dividing the SYNC pattern into a plurality of groups. Each of the divided groups includes a predetermined plurality of symbols, and each of the symbols is included in at least two groups of the plurality of divided groups. One benefit of this division group approach is that it increases the number of symbols included in each of the groups even when the number of the divided groups are increased accordingly in order to accurately detect the SYNC signal and even when a large number of defects exist in the disk medium. Further, the invention can reduce the probability of detecting an error in the SYNC region 92.

Other embodiments of the present invention will be apparent to those skilled in the art from consideration of the specification and practice of the invention disclosed herein. In particular, the invention is applicable to any types of information storage devices, such as a light disk device, a light magnetic disk device, a CD-ROM device, a floppy disk device, a magnetic tape device, in that data are recorded in a predetermined recording unit and a SYNC pattern is designated for each of the recording units. It is intended that the specification and examples be considered as exemplary only, with a true scope and sprit of the invention being indicated by the following claims.

What is claimed is:

1. An apparatus for detecting synchronous (SYNC) signals written on a recording medium adapted to reproduce data including a SYNC pattern therefrom, the SYNC pattern comprises a predetermined number of symbols written in a predetermined recording unit of said record medium, comprising:

a data reproducing mechanism for reproducing the data including the SYNC pattern;

a data dividing mechanism for dividing the reproduced SYNC pattern into a plurality of divided groups, each of the divided groups including at least one symbol contained in another divided group so as to overlap the symbols within the divided groups;

a comparison mechanism for comparing the symbols of the SYNC pattern with the symbols of each of the divided groups to detect a match between the SYNC pattern and at least one of the divided groups; and an output mechanism for outputting a SYNC detected signal when said at least one of the divided groups matches said SYNC pattern;

wherein, when the SYNC pattern comprises (n) symbols; and said data dividing mechanism divides the SYNC pattern into a number of divided groups to satisfy the formula $_nC_k$, each of the divided group comprises (n–k) symbols in order to detect the SYNC detected signal even when k symbols of the reproduced SYNC pattern include errors (here, (k) is a natural number that satisfies the condition, k<n, (n) represents the number of symbols contained in the SYNC pattern and (k) represents the number of symbols containing an error).

2. The apparatus for detecting SYNC signals according to claim 1, wherein said (k) symbols represents consecutive symbols of the SYNC pattern which are defected.

3. Apparatus for detecting SYNC signals written on a recording mechanism adapted to reproduce data including a SYNC pattern recorded therein, said SYNC pattern being recorded in a predetermined recording unit of said recording medium, comprising:

a data reproducing mechanism for reproducing the data including the SYNC pattern, said SYNC pattern comprises a predetermined number of symbols;

a comparison mechanism for comparing the reproduced SYNC pattern as a whole in order to output a SYNC detected signal during normal operating conditions;

an adjustment mechanism for switching the operation of the comparison mechanism from comparing the SYNC pattern as a whole to a retry operation comprising:

a data dividing mechanism for dividing the reproduced SYNC pattern into a plurality of groups, each of the divided groups comprising a predetermined number of symbols so as to overlap the symbols in at least two of the divided groups of the retry operation;

a comparison mechanism for comparing the symbols of the SYNC pattern with the symbols of each of the divided groups to detect a match between the SYNC pattern and at least one of the divided groups; and an output mechanism for outputting a SYNC detected signal when said at least one of the divided groups matches said SYNC pattern;

wherein, when the SYNC pattern comprises (n) symbols; and said data dividing mechanism divides the SYNC pattern into a number of divided groups to satisfy the formula $_nC_k$, each of the divided group comprises (n−k) symbols in order to detect the SYNC detected signal even when k symbols of the reproduced SYNC pattern include errors (here, (k) is a natural number that satisfies the condition, k<n, (n) represents the number of symbols contained in the SYNC pattern and (k) represents the number of symbols containing an error).

4. The apparatus for detecting SYNC signals according to claim 3, wherein said (k) symbols represents consecutive symbols of the SYNC pattern which are defected.

* * * * *